(12) United States Patent
Li

(10) Patent No.: US 12,047,023 B2
(45) Date of Patent: Jul. 23, 2024

(54) TORQUE MAP GENERATION SYSTEM

(71) Applicant: RENESAS ELECTRONICS CORPORATION, Tokyo (JP)

(72) Inventor: Chengzhe Li, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 442 days.

(21) Appl. No.: 17/399,616

(22) Filed: Aug. 11, 2021

(65) Prior Publication Data

US 2023/0053309 A1 Feb. 16, 2023

(51) Int. Cl.
| | |
|---|---|
| *H02P 6/12* | (2006.01) |
| *B60L 3/12* | (2006.01) |
| *B60L 15/02* | (2006.01) |
| *H02P 21/20* | (2016.01) |
| *H02P 21/22* | (2016.01) |

(52) U.S. Cl.
CPC .............. *H02P 21/20* (2016.02); *B60L 3/12* (2013.01); *B60L 15/025* (2013.01); *H02P 21/22* (2016.02); *B60L 2240/423* (2013.01); *B60L 2240/429* (2013.01)

(58) Field of Classification Search
CPC .......... H02P 21/20; H02P 21/22; H02P 21/18; B60L 15/025; B60L 2240/429; B60L 2240/423
See application file for complete search history.

(56) References Cited

U.S. PATENT DOCUMENTS 11,025,157 B2   6/2021   Minesawa et al.

FOREIGN PATENT DOCUMENTS

| JP | 2020-102923 A | 7/2020 | |
|---|---|---|---|
| KR | 20160111632 A | * 3/2015 | |
| WO | WO-2011122104 A1 | * 10/2011 | .......... H02P 21/0021 |

\* cited by examiner

*Primary Examiner* — Karen Masih
(74) *Attorney, Agent, or Firm* — Rimon P.C.

(57) ABSTRACT

A torque map generation system includes a motor, an inverter that drives the motor, a controller that controls the inverter, a torque sensor coupled to the motor, a power analyzer coupled to the torque sensor and a torque map generator that measures a current vector value of the motor by switching a MTPA (Maximum Torque Per Ampere) method and a square wave method based on a voltage utilization ratio of the inverter, wherein the torque map generator utilizes a measurement result by the MTPA method when the torque map generator uses the square wave method.

12 Claims, 14 Drawing Sheets

TORQUE MAP GENERATION SYSTEM

BACKGROUND

The present invention relates to a torque map generation system for driving a motor.

Recently, with the popularization of electric vehicles (EVs) and hybrid electric vehicles (HEVs), motor control with high efficiency is required. As motor control, torque control is known. The torque control, in accordance with the required motor torque value (torque command value), is intended to determine the current value for driving the motor (current command value). MTPA (Maximum Torque Per Ampere) control is known as highly efficient torque control. In MTPA control, the current command value is determined by a computational expression or the torque map. The Torque map is generated in advance using a motor bench system or the like. Further, as the motor control, in addition to MTPA control, square-wave control is known. MTPA control may be unsuitable when the motor is rotating at high speed, in which case square-wave control is used.

Patent Document 1 discloses a technique relating to a control process using a torque map.

PRIOR-ART DOCUMENT

Patent Document

[Patent Document 1] Japanese Unexamined Publication Laid-Open No. 2020-102923

SUMMARY

However, in the calculation formula described above, by an influence of motor inductance parameters depending on a current, there is an error in the result. In addition, it takes time to generate the torque map. The system which supports both MTPA control and square wave control, and generates torque map at high speed is required.

Other objects and novel features will become apparent from the description of the specification and drawings.

A torque map generation system according to an embodiment includes a motor, an inverter that drives the motor, a controller that controls the inverter, a torque sensor coupled to the motor, a power analyzer coupled to the torque sensor and a torque map generator that measures a current vector value of the motor by switching a MTPA (Maximum Torque Per Ampere) method and a square wave method based on a voltage utilization ratio of the inverter, wherein the torque map generator utilizes a measurement result by the MTPA method when the torque map generator uses the square wave method.

According to the present invention, it is possible to generate a torque map supporting both MTPA control and the square-wave control at high speed.

DETAILED DESCRIPTION

Figure 1:
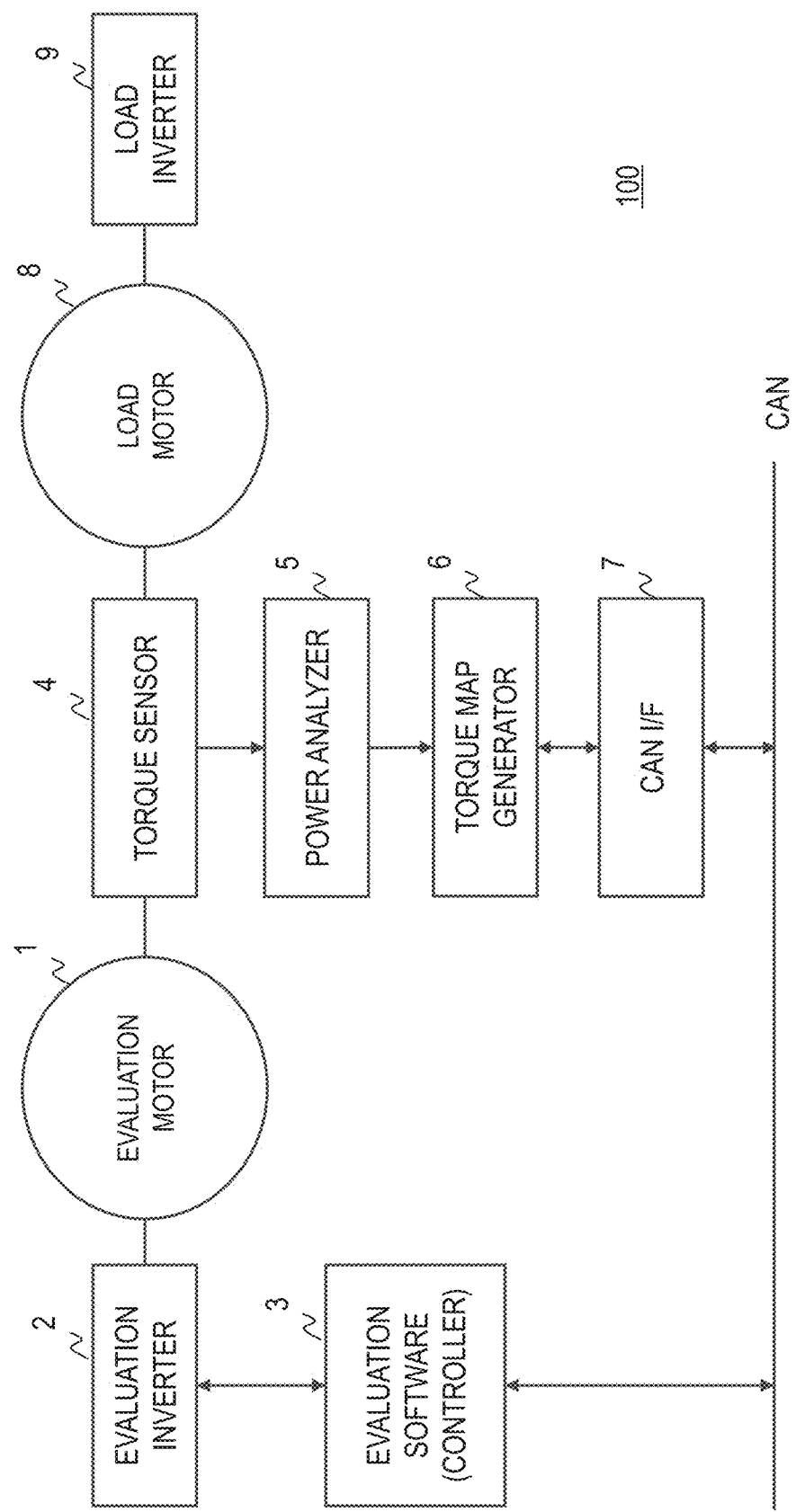
FIG. 1 is a block diagram of a torque map generation system according to first embodiment.

Hereinafter, the torque map generation system according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a schematic diagram of a torque map generation system 100 according to first embodiment. As shown in FIG. 1, the torque map generating system 100 includes an evaluation motor 1, evaluation inverter 2, evaluation software 3, torque sensor 4, a power analyzer 5, torque map generator 6, CAN interface 7, a load motor 8, a load inverter 9.

Evaluation motor 1 is driven by the evaluation inverter 2. The evaluation inverter 2 is controlled by evaluation software 3. The evaluation software 3 operates on a microcontroller (not shown). The microcontroller is equipped with a function to measure the rotation angle, temperature, and output voltage/current of the evaluation inverter of the evaluation motor 1.

Torque sensor 4 measures the torque of the evaluation motor 1 in operation, and transmits the measurement result to the power analyzer 5. The power analyzer 5 calculates the torque value, motor efficiency, inverter efficiency, and system efficiency based on the measurement results of the torque sensor 4.

The torque map generator 6 is an application running on a computer such as a personal computer. Torque map generator 6 generates a torque map based on the measured value of the power analyzer 5 and the output value of the evaluation software 3 (the measured value by the microcontroller described above).

Load motor 8 (controlled by the load inverter 9) is for rotating the evaluation motor 1 at a predetermined speed.

Figure 2:
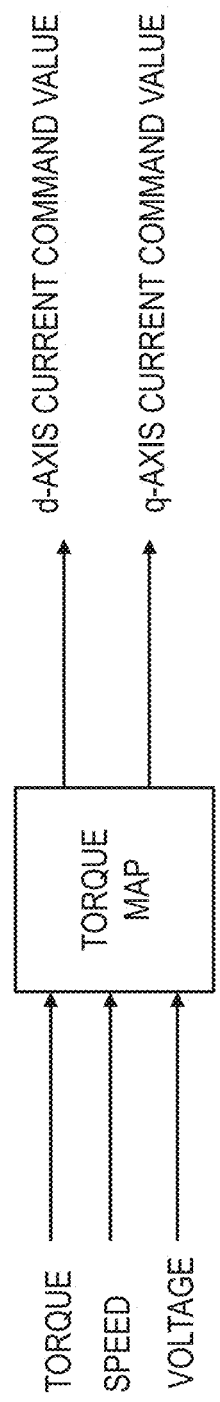
FIG. 2 is a diagram for explaining a torque map according to first embodiment.

FIG. 2 is a diagram for explaining a torque map. As shown in FIG. 2, the torque map is intended to convert command values of torque and speed and an operating voltage to current command values of the d-axis and the q-axis of the motor. The torque map is installed on a microcontroller for controlling the motor. The microcontroller converts command values (torque, speed) for causing the motor to perform the desired operation to the current command values of the d-axis and the q-axis using the torque map. The converted d-axis current command value and the q-axis current command value are converted into a PWM (Pulse Width Modulation) signal by the microcontroller. The PWM signal is outputted to the inverter for driving the motor. Since the motor control by the microcontroller using the current command value of the d-axis, the current command value of the q-axis and the PWM signal is a common technique, a detailed description thereof will be omitted.

Next, the basic operation of the torque map generation system 100 will be described. The basic operation is as follows. 1. Load motor 8 rotates the evaluation motor 1 at a predetermined speed. 2. Evaluation software 3, based on the instruction of the torque map generator 6, changes the current vector for driving the evaluation motor 1 (details will be described later). Torque map generator 6 records the measurement results based on the output of the power analyzer 5. 3. Load motor 8 changes the rotational speed of the evaluation motor 1. Based on the measurement information obtained by repeating steps 2 to 3, the torque map generator 6 generates a torque map.

Prior to describing how to generate the torque map, the method of MTPA control and the square-wave control will be described. In first embodiment, it is characterized in that it generates the torque map supporting both MTPA control and square-wave control.

Figure 3:
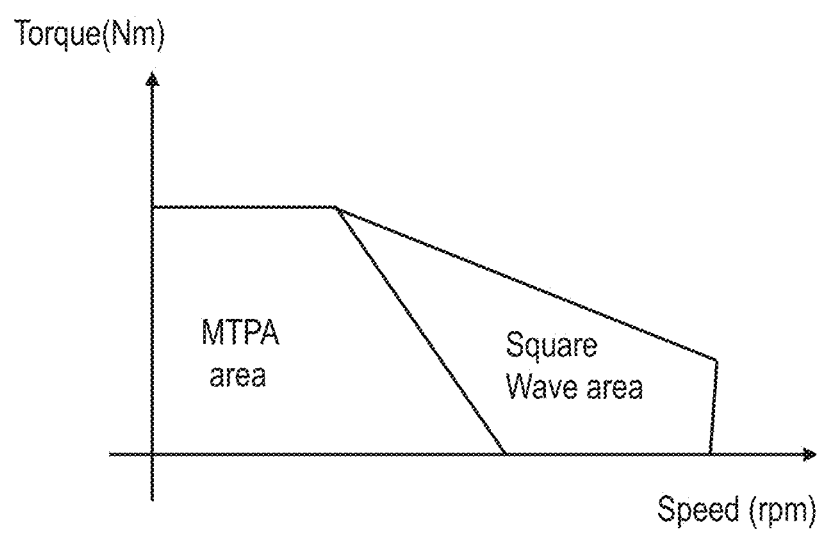
FIG. 3 is a diagram for explaining MTPA control and square-wave control according to first embodiment.

FIG. 3 is a diagram illustrating the proper use of MTPA control and the square-wave control. As shown in FIG. 3, when the motor is rotating at low and medium speed and the voltage utilization factor (also referred to as modulation factor) is low, MTPA control is performed. Square wave control is performed when the motor is rotating at high speed and the voltage utilization factor is high. The voltage utilization factor is the ratio of the output voltage and the maximum output voltage of the inverter.

Figure 4:
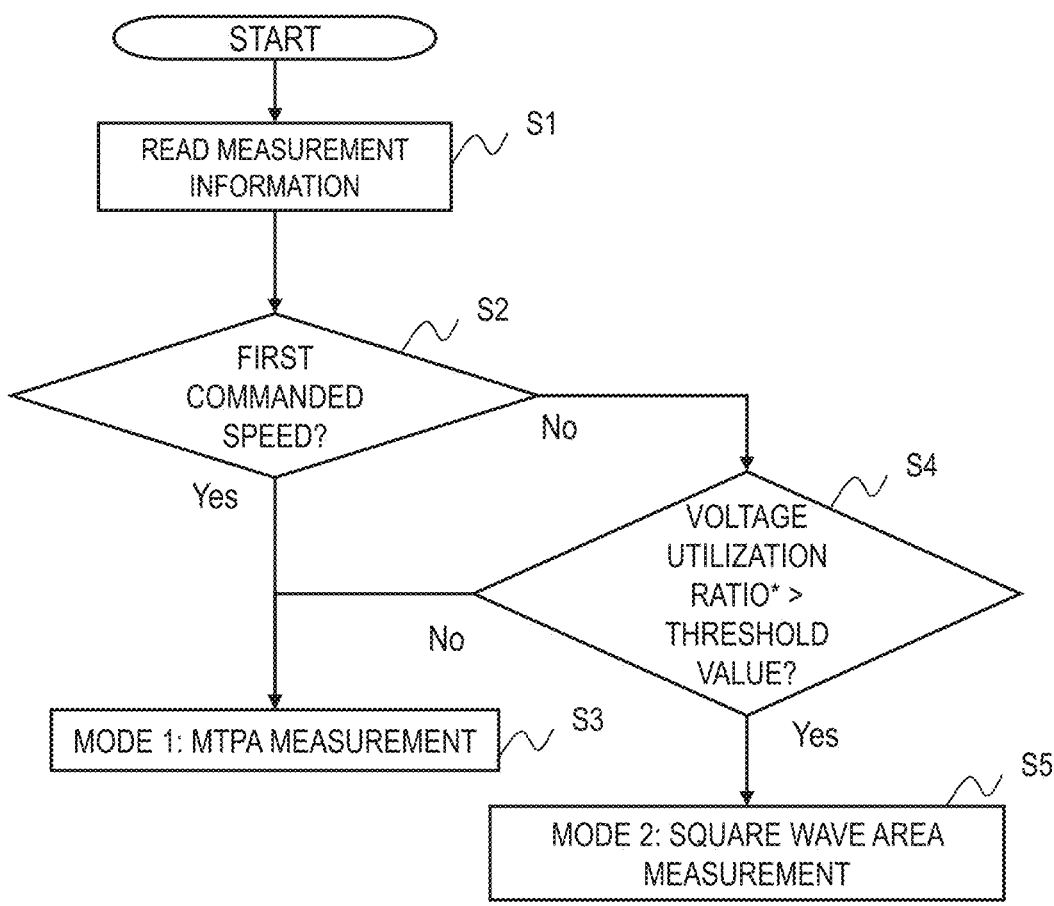
FIG. 4 is a flow chart for explaining the operation of the torque map generation system according to first embodiment.

Next, how to generate the torque map according to the present first embodiment will be described. FIG. 4 is an overall flow chart of the torque map generation method according to first embodiment. In step S1, the torque map generator 6 first reads the measurement information. In step S2, it is determined whether the measurement is based on a first command speed. If the measurement is based on the first commanded speed, the torque map generator 6 selects MTPA measurement method (mode 1) (step S3). If not the measurement by the first commanded speed, it is determined whether the voltage utilization ratio exceeds the threshold value (step S4). The voltage utilization ratio is calculated by the ratio of the output voltage and the maximum output voltage of the inverter included in the measurement information at the previous commanded speed. If the voltage utilization ratio exceeds the threshold value, the torque map generator 6 selects the square wave region measurement method (mode 2) (step S5). If the voltage utilization ratio does not exceed the threshold, the torque map generator 6 selects MTPA measurement method (mode 1). By repeating S1 to S5, the measurement information necessary for the torque map can be obtained.

Figure 5:
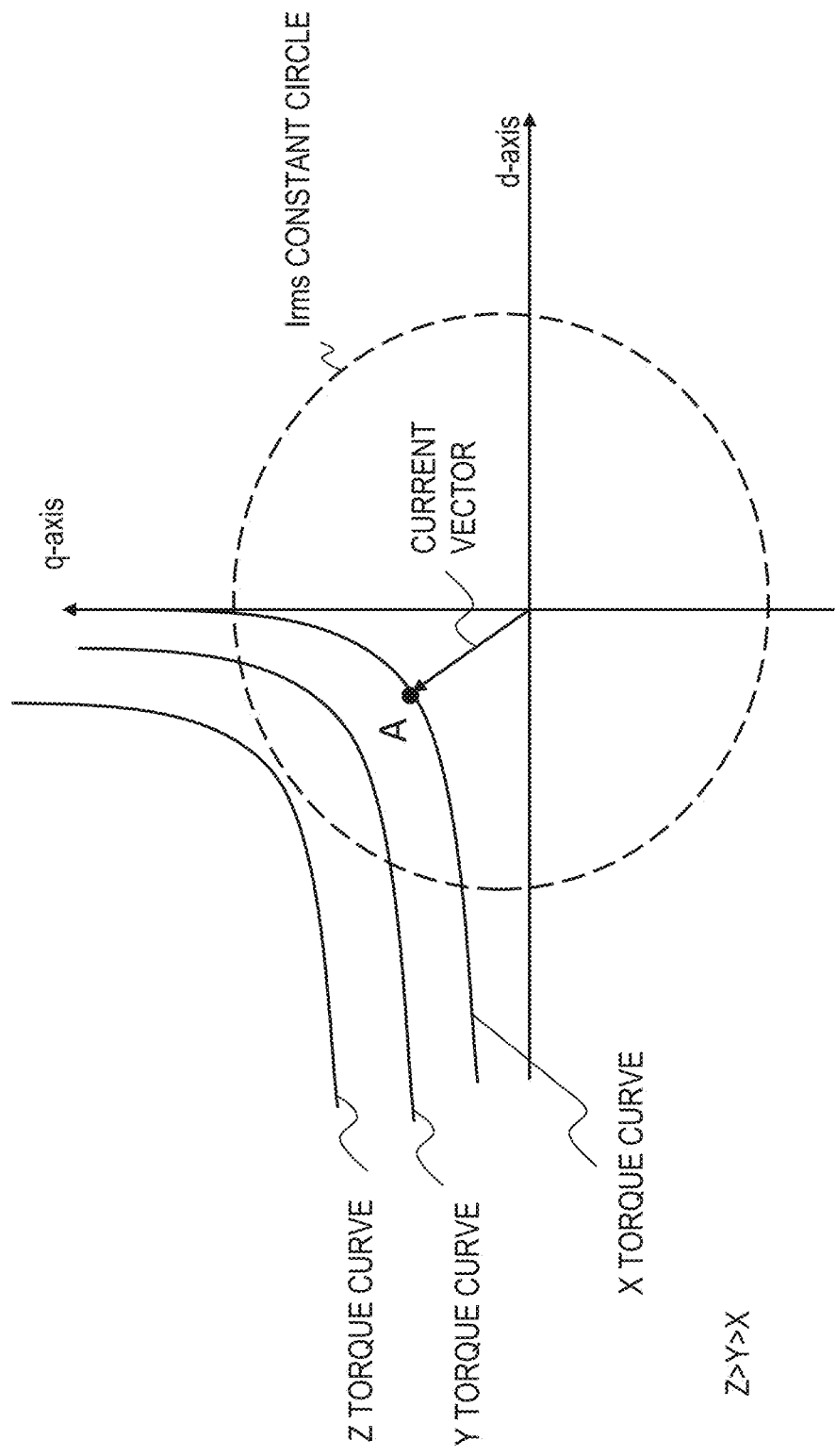
FIG. 5 is a diagram for explaining the operation of the torque map generation system according to first embodiment.
Figure 6:
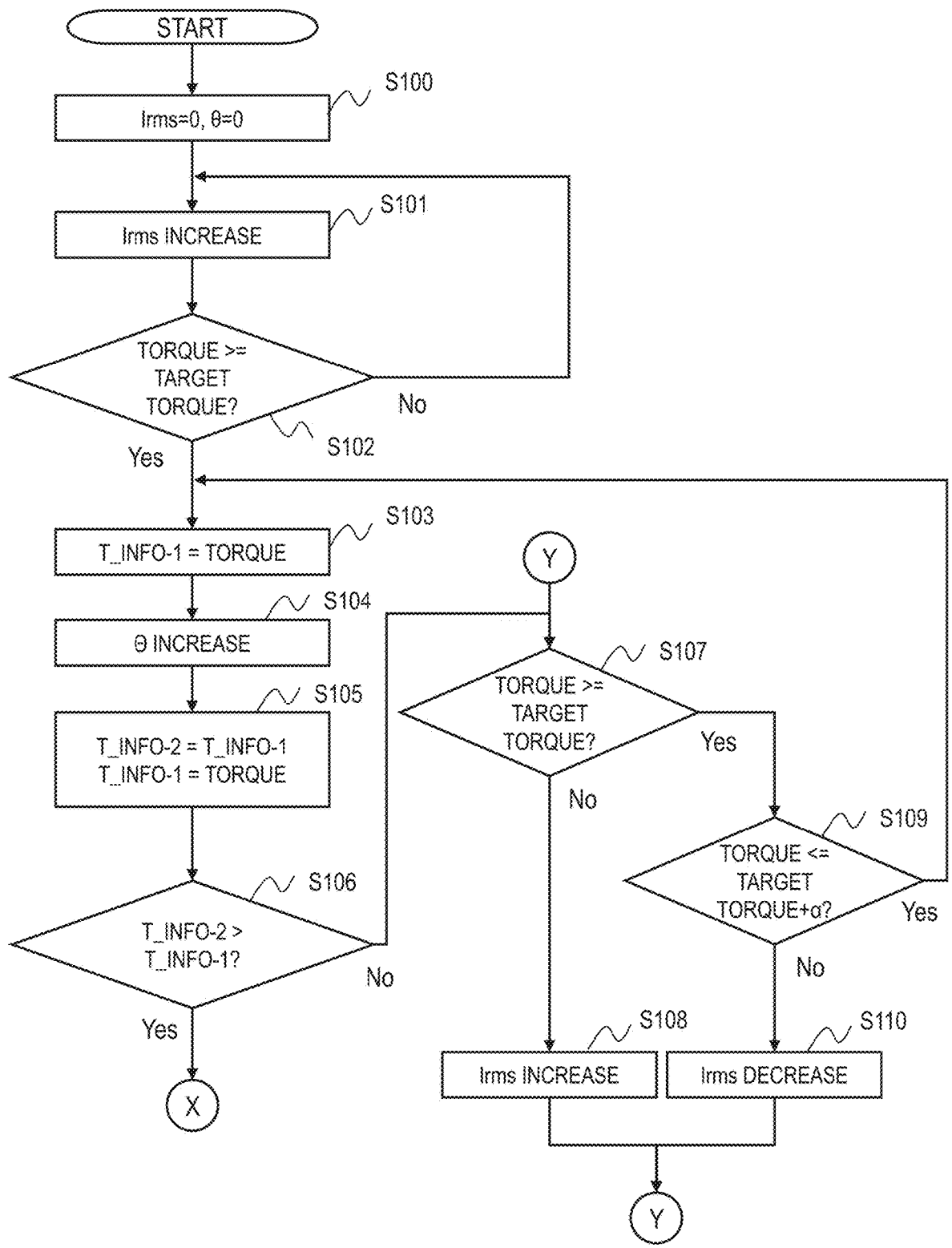
FIG. 6 is a flow chart for explaining the operation of the torque map generation system according to first embodiment.
Figure 7:
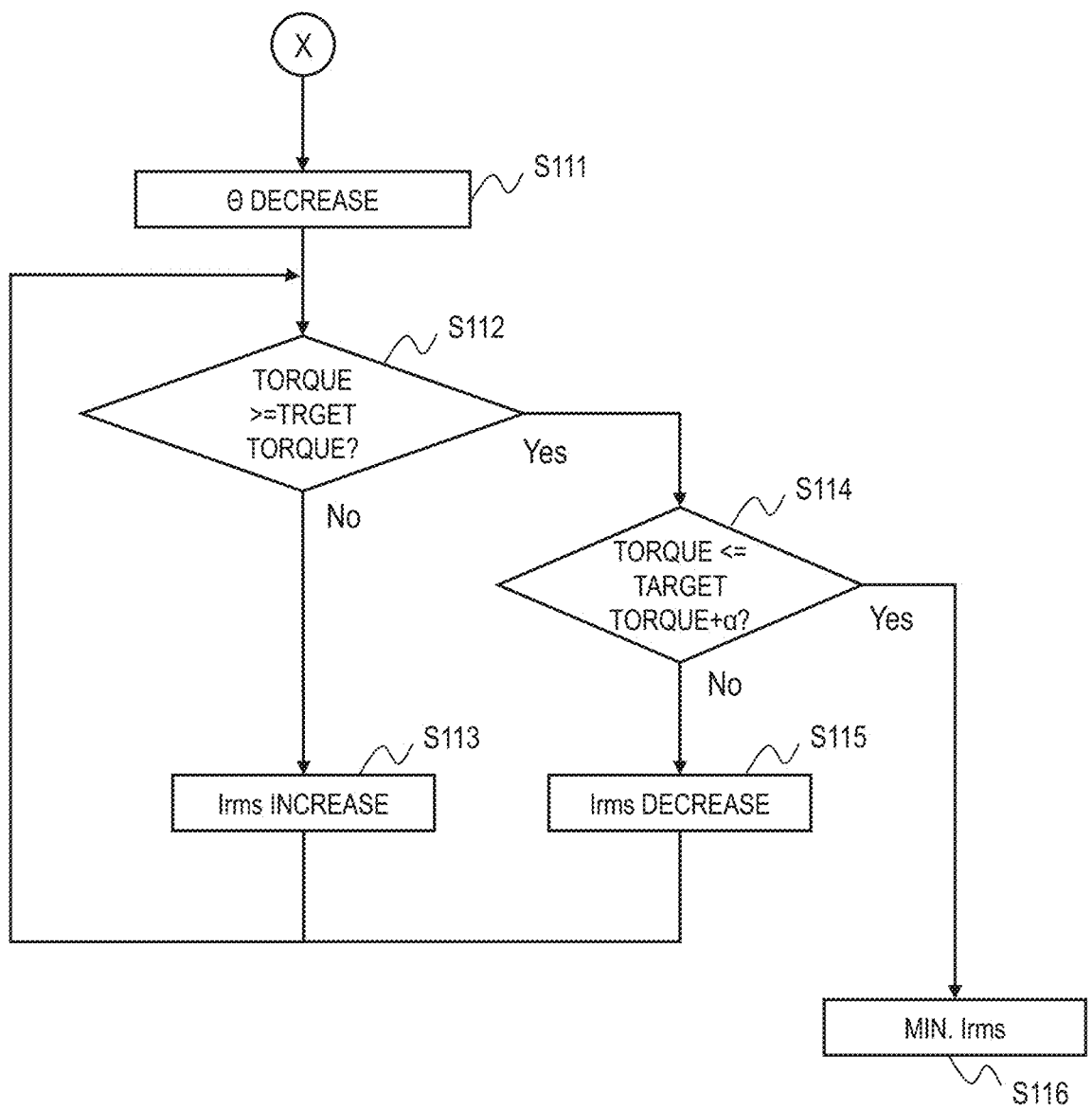
FIG. 7 is a flow chart for explaining the operation of the torque map generation system according to first embodiment.

Next, MTPA measurement method will be described. FIG. 5 is a diagram for explaining MTPA measurement method. MTPA measurement method is a method to measure the minimum current vector (current command value of the d-axis, the current command value of the q-axis) in order to obtain a predetermined torque at a predetermined speed. By MTPA measuring method, for example, the minimum current vector value A for obtaining the X-torque is measured. The X, Y, and Z torque curves shown in FIG. 5 are called constant torque curves and are determined by the following expression.

$$T = p_n(\psi_a + (1 - L_q/L_d) \cdot L_d \cdot id) \cdot iq \qquad \text{Expression (1)}$$

Here, T is a torque, Pn is a pole pair number of the motor, Lq is an inductance of the q-axis, Ld is an inductance of the d-axis, $\Psi a$ is interlinkage magnetic flux, id is d-axis current, iq is q-axis current.

MTPA measurement method will be further explained with reference to FIGS. 6 to 11. To determine the minimum current vector value A described above, first the current value of the current vector Irms is set to 0, the advance angle θ (angle between Irms and q-axis) is set to 0 (step S100). Increase the current value of Irms until a predetermined torque value (X) is obtained (steps S101, S102). The torque value at this time is recorded (step S103). The current value of Irms remains, increasing the advance angle θ by a predetermined value (step S104). The torque value at this time is recorded (step S105). It is verified whether the torque value is increased or decreased by the increase of the advance angle θ in step S106. If the torque value is increased (No), it verifies whether the torque value is greater than the predetermined torque value (X) (step S107). If the torque value is smaller than the predetermined torque value (No), the advance angle remains θ, increasing the current value of Irms (step S108). If the torque value is greater than the predetermined torque value (Yes), the torque value is verified whether smaller than a predetermined torque value+α (step S109). If the torque value is smaller than the predetermined torque value+α (Yes), the process returns to the step S103. If the torque value is greater than the predetermined torque value+α (No), the advance angle remains θ, reducing the current value of Irms (step S110). After steps S108, S110, the process returns to step S107.

If the torque value is decreased (Yes) in step S106, the advance angle θ is decreased by a predetermined value (step S111). By decreasing the advance angle θ, it is verified whether the torque value is greater than the predetermined torque (step S112). If the torque value is smaller than the predetermined torque value (No), increasing the current value of Irms (step S113). If the torque value is greater than the predetermined torque value (Yes), the torque value is verified whether smaller than the predetermined torque value+α (step S114). If the torque value is greater than the predetermined torque value+α (No), reducing the current value of Irms (step S115). After steps S113, S115, the process returns to step S112. If the torque value is smaller than the predetermined torque value+α (Yes), the current vector Irms at that time (d-axis current value, q-axis current value) is determined as the minimum current vector value to obtain the predetermined torque value (X) (S116).

Figure 8:
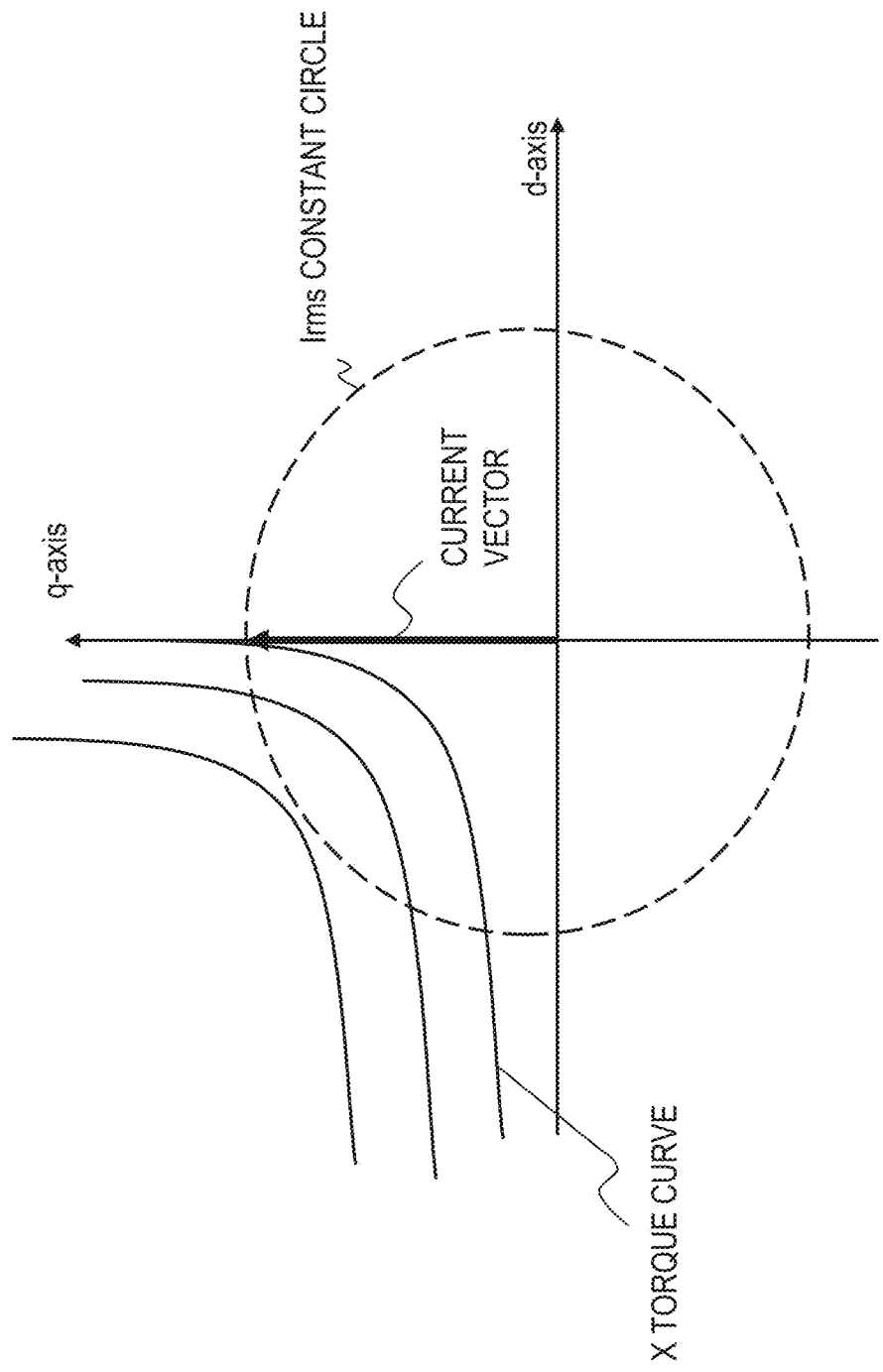
FIG. 8 is a diagram for explaining the operation of the torque map generation system according to first embodiment.
Figure 9:
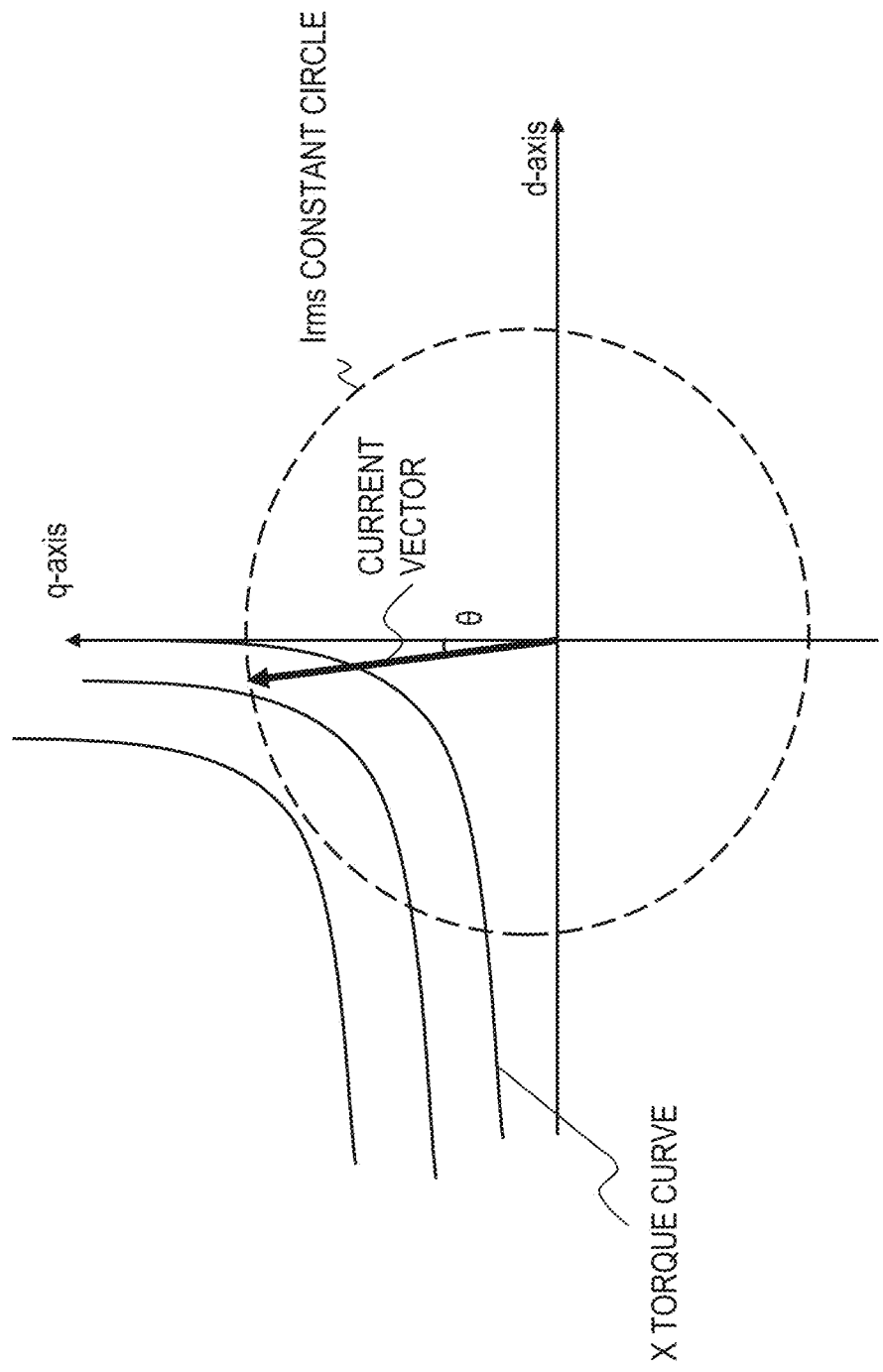
FIG. 9 is a diagram for explaining the operation of the torque map generation system according to first embodiment.
Figure 10:
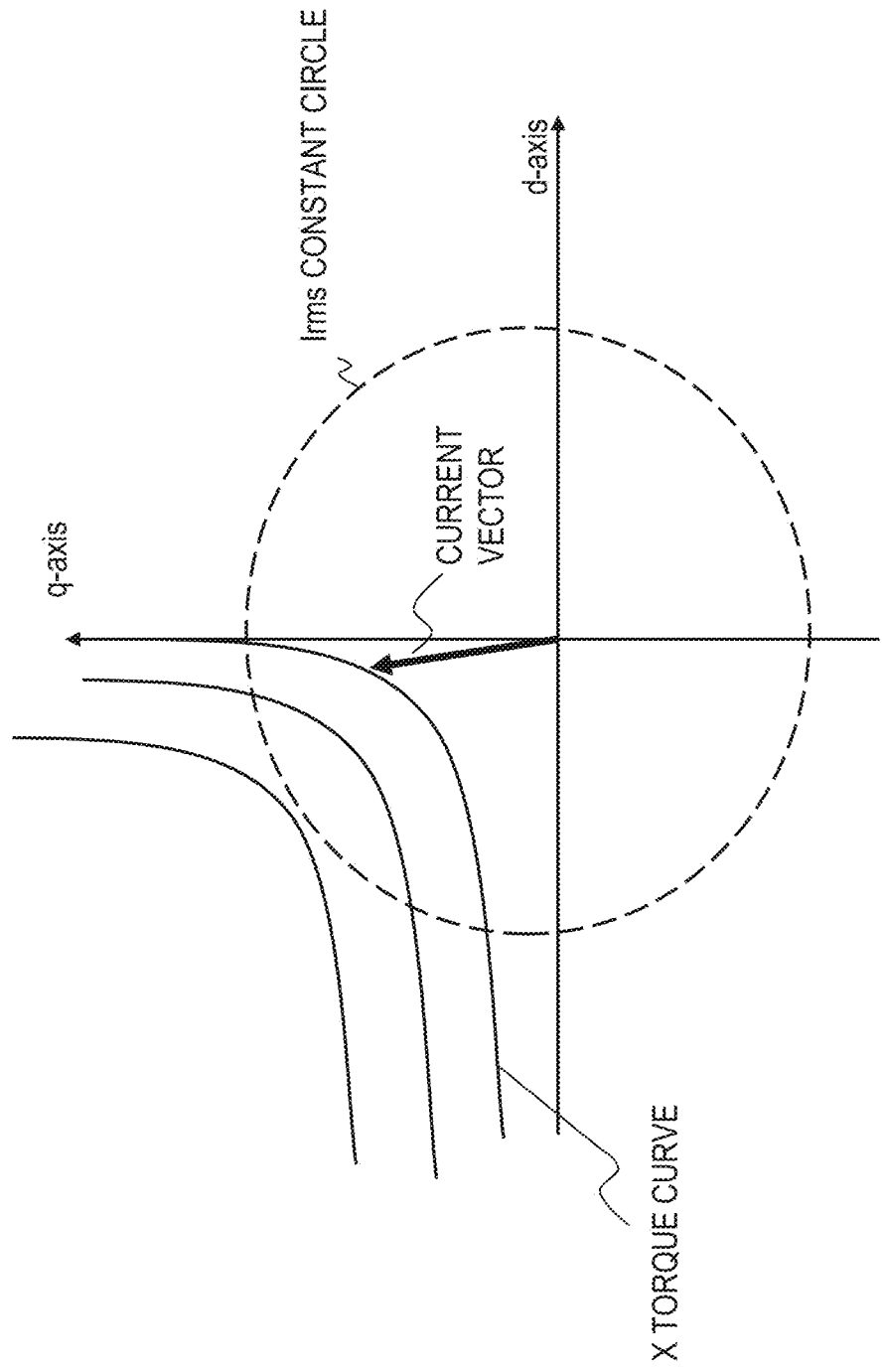
FIG. 10 is a diagram for explaining the operation of the torque map generation system according to first embodiment.
Figure 11:
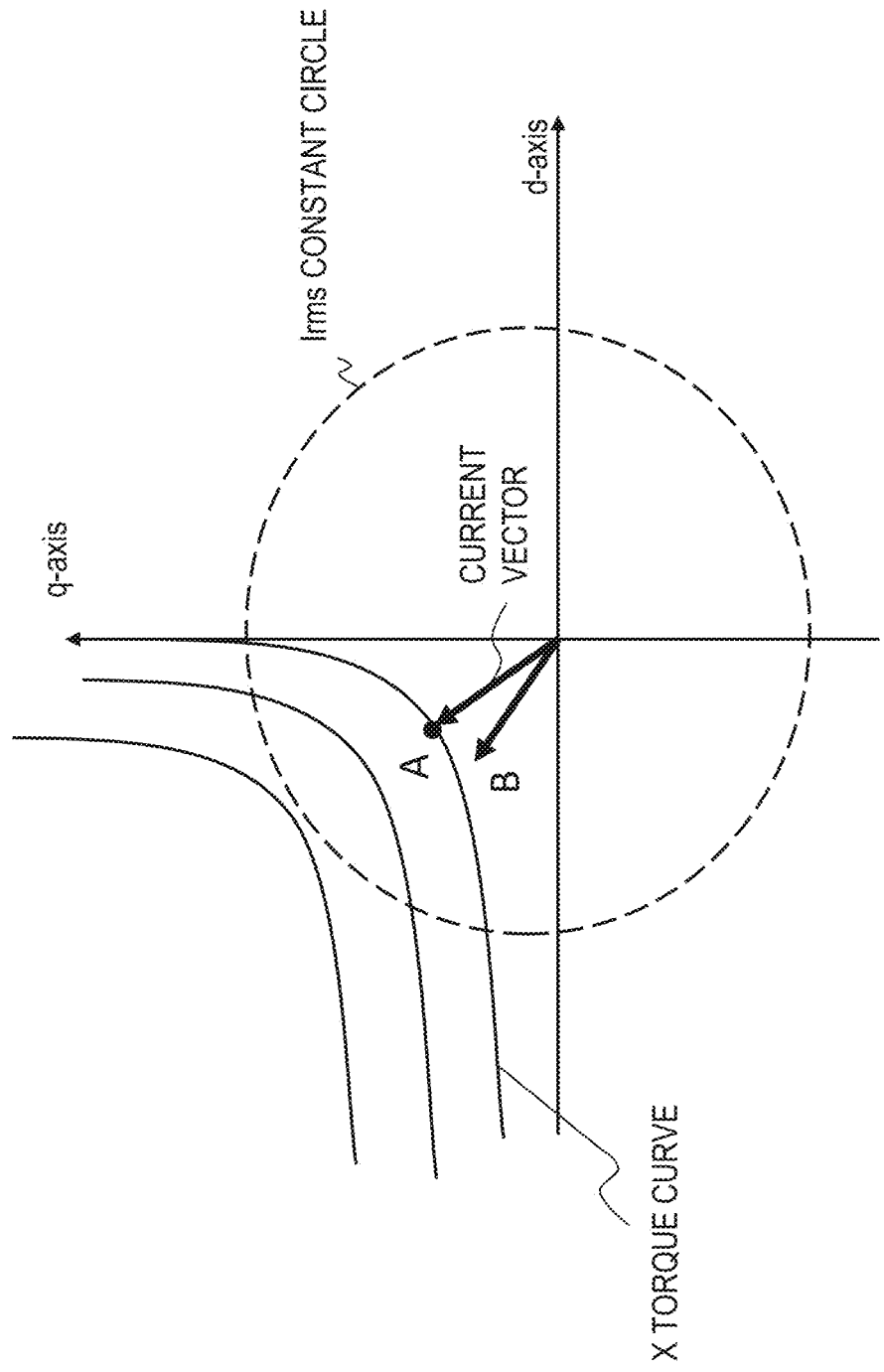
FIG. 11 is a diagram for explaining the operation of the torque map generation system according to first embodiment.

FIGS. 8 to 11 are specific operation examples. FIG. 8 shows the state immediately after step S102. FIG. 9 shows the state immediately after step S104. In the case of FIG. 9, by increasing the advance angle θ, the torque value is larger than the predetermined torque value (X) (above the X torque curve). FIG. 10 shows the state immediately after step S110. Point B in FIG. 11 shows the state immediately after step S106 (Yes) after repeating the steps S103-S110, which is below the X-torque curve. Point A in FIG. 11 shows the state immediately after step S116 after step S111.

As described above, by the MTPA measurement method, the minimum current vector (current command value of the d-axis, the current command value of the q-axis) is measured in order to obtain a predetermined torque at a predetermined speed. Incidentally, a curve connecting the minimum current vector values measured for torques (e.g., X, Y, Z in FIG. 5) is referred to as a MTPA curve.

Next, a method of generating a torque map in the square wave measurement method will be described. As described above, when the voltage utilization ratio exceeds the threshold, the measurement method switches from MTPA measurement method to the square-wave measurement method.

First, the meaning of switching from MTPA measurement method to the square-wave measurement method will be described. As the rotational speed ω of the motor increases, an induced voltage increases and the terminal voltage also increases. The supply voltage to the inverter driving the motor is limited by a battery voltage. When the terminal voltage becomes higher than the supply voltage, voltage saturation occurs, and the rotation speed of the motor becomes the speed limit. To suppress an increase of the induced voltage, flux-weakening control utilizing a negative d-axis current is performed. When the induced voltage limit value is Vom, the following expression holds.

$$(Ld*id + \psi_a)^2 + (Lq*iq)^2 = \left(\frac{Vom}{\omega}\right)^2 \quad \text{Expression (2)}$$

Expression (2) means that when the rotation speed ω of the motor increases, the range of the current vector value decreases. That is, this means that the above-mentioned MTPA measurement method does not work properly. Therefore, in first embodiment, when the motor rotates at high speed and the voltage utilization ratio is high, the square wave measurement method is used.

Figure 12:
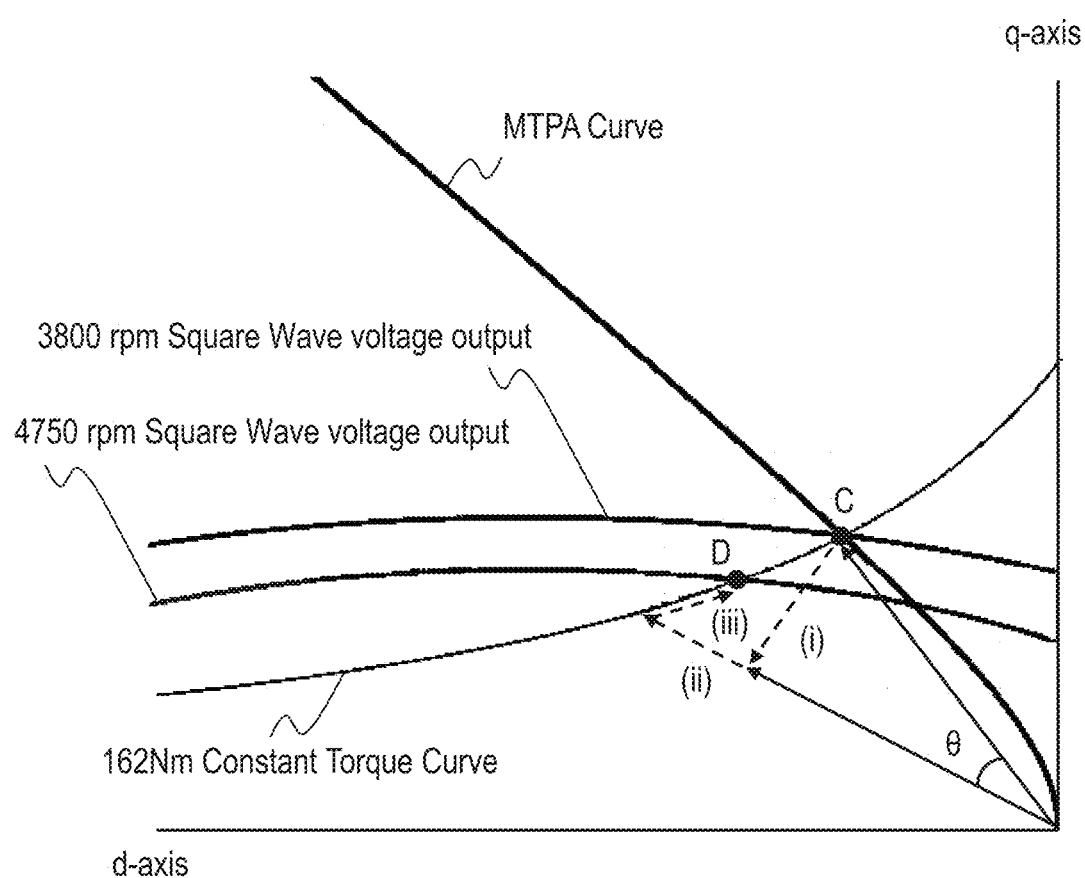
FIG. 12 is a diagram for explaining the operation of the torque map generation system according to first embodiment.
Figure 13:
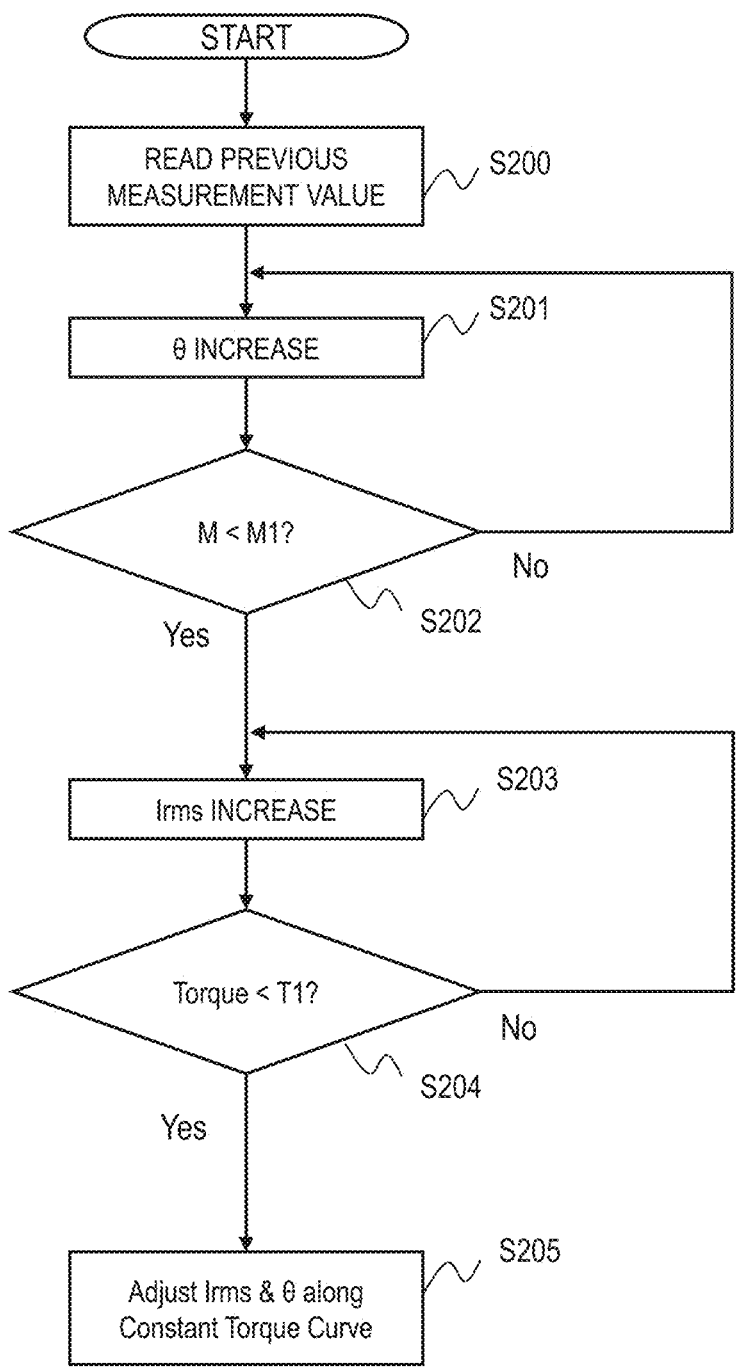
FIG. 13 is a flowchart for explaining the operation of the torque map generation system according to first embodiment.

FIGS. 12 and 13 are diagrams for explaining a torque map generation method in the square wave measurement method. It is assumed that the point C in FIG. 12 has been measured by MTPA measurement method described above. Point C is the point at which the motor rotates at 3800 RPM and the torques become 162 Nm. Point C is also a point on the MTPA curve. After the point C has been measured, the point D will be measured. Point D is the point at which the motor rotates at 4750 RPM and the torques become 162 Nm. As shown in FIG. 12, point C is located outside the square wave voltage circle (expression (2)) of constant rotation (4750 rpm), the voltage utilization ratio exceeds the threshold value. In first embodiment, the point D is measured using the point C as a starting point.

First, the measured result (Irms) of the point C is read (step S200). Next, as shown in (i) of FIG. 12, the advance angle θ of Irms is increased from the point C until the voltage utilization ratio (M) falls to the predetermined voltage utilization ratio (Ml) (steps S201 and 202). Next, as shown in (ii) of FIG. 12, the current value of Irms is increased while maintaining the advance angle θ until the torque value reaches the predetermined value (T1=162 Nm) (step S203, step 204). Next, as shown in (iii) of FIG. 12, the current value and the advance angle of Irms are adjusted along the constant torque curve (162 Nm) so as to reach the point D (the intersection point of the square-wave voltage output at 4750 rpm and the constant torque curve of 162 Nm) (step S205). The current vector Irms (d-axis current value, q-axis current value) is recorded when it reaches point D.

When measuring other point by the square wave measurement method after point D measurement, repeat the above with point D as the starting point.

As described above, in the torque map generating system 100 according to first embodiment, the torque map is generated by switching to MTPA measurement method or the square wave measurement method according to the voltage utilization ratio. In addition, when switching from MTPA measurement method to the square-wave measurement method, the result measured by MTPA measurement method is used. This enables to generate the torque map supporting both MTPA control and square-wave control at high generation speed.

Second Embodiment

Torque map generation systems according to second embodiment are similar to first embodiment (FIG. 1). However, the generated torque map is different.

Figure 14:
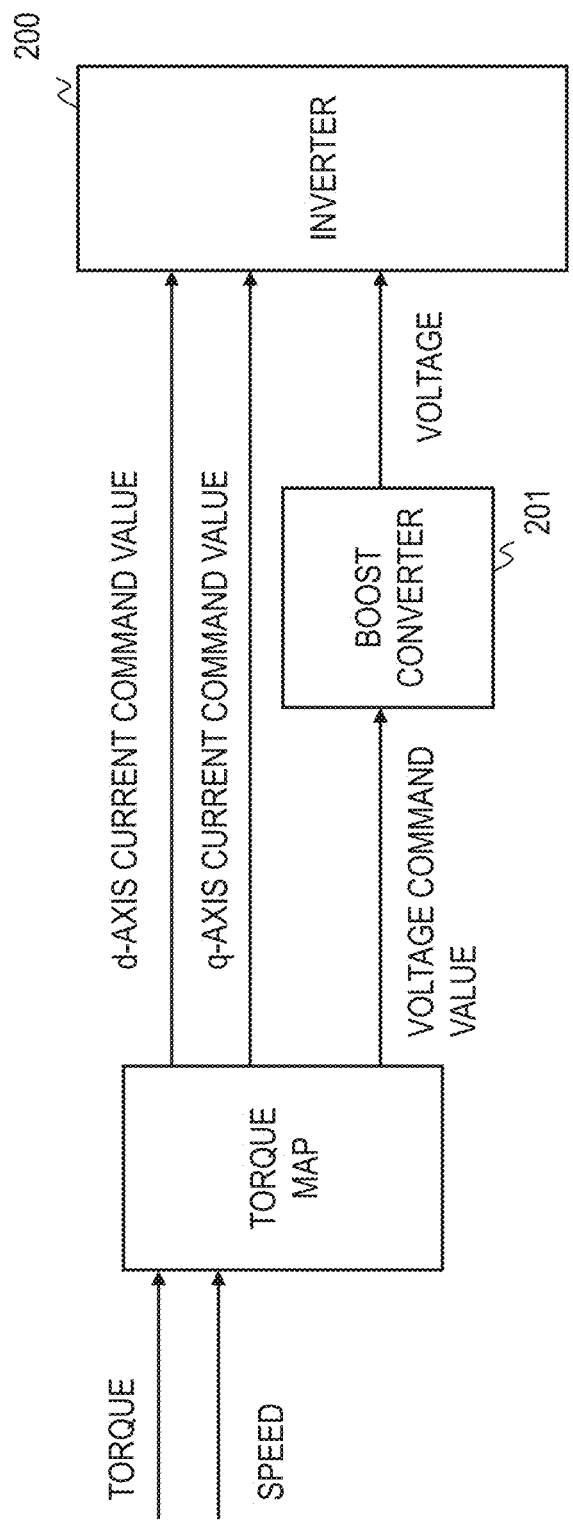
FIG. 14 is a diagram for explaining a torque map according to second embodiment.

FIG. 14 is a schematic diagram of a motor control system according to second embodiment; Since the motor control system itself is known, FIG. 14 is a simplified diagram. As shown in FIG. 14, the inverter 200 for driving the motor, the boost converter 201 is connected. In this system, voltage information is also required in the torque map, because the voltage supplied to the inverter 200 can be made variable. Therefore, in the torque map according to second embodiment, a voltage command value is added as an output.

The basic operation of the torque map generation system according to second embodiment is the same as that of first embodiment. However, while changing the voltage supplied to the inverter, the current vector (d-axis current value and q-axis current value) is measured. In addition, the efficiency of each boost converter, inverter, and motor is also measured. In this way, with respect to the command values of the torque and speed, the torque map that can output the d-axis current command value, q-axis current command value and the voltage command value in consideration of the system efficiency (boost converter, inverter, the efficiency of the motor) can be generated.

As described above, in the torque map generation system according to second embodiment, the torque map capable of outputting the voltage command value can be generated. In addition to the effectiveness of first embodiment, the torque map can be generated for more efficient motor control systems.

It should be noted that the present invention is not limited to the above-mentioned embodiments, and various modifications can be made without departing from the gist thereof.

What is claimed is:
1. A torque map generator system comprising:
  a motor;
  an inverter that drives the motor;
  a controller that controls the inverter;
  a torque sensor coupled to the motor;
  a power analyzer coupled to the torque sensor; and
  a torque map generator that measures a current vector value of the motor by switching a MTPA (Maximum Torque Per Ampere) method and a square wave method based on a voltage utilization ratio of the inverter, wherein the torque map generator utilizes a measurement result by the MTPA method when the torque map generator uses the square wave method, wherein, in the MTPA method, by adjusting the current vector value using a constant torque curve of the motor, a minimum current vector value for generating a predetermined torque to the motor is measured, and wherein, in the square wave method, starting from the measurement result by the MTPA method, by adjusting the current vector value using a constant rotation square wave voltage circle of the motor, a current vector value for generating a predetermined torque to the motor is measured.

2. The torque map generator system according to claim 1, wherein the torque map generator measures the minimum current vector value by individually adjusting a current value and an advance angle of the current vector.

3. The torque map generator system according to claim 1, wherein when the torque map generator starts from a measured current vector in the measurement result by the MTPA method, the torque map generator increases an advance angle of the measured current vector.

4. A torque map generator system comprising:
a motor;
an inverter that drives the motor;
a controller that controls the inverter;
a torque sensor coupled to the motor;
a power analyzer coupled to the torque sensor; and
a torque map generator that measures a current vector value of the motor by switching a MTPA (Maximum Torque Per Ampere) method and a square wave method based on a voltage utilization ratio of the inverter,
wherein the torque map generator utilizes a measurement result by the MTPA method when the torque map generator uses the square wave method,
wherein the torque map generator generates a torque map based on the measurement results by the MTPA method and the square wave method, and
wherein the torque map is for converting a torque command value and a speed command value to a d-axis current value and a q-axis current value.

5. The torque map generation system according to claim 4, wherein the torque map further converts to a voltage command value.

6. A torque map generation system comprising:
a motor;
an inverter that drives the motor;
a controller that controls the inverter;
a torque sensor coupled to the motor;
a power analyzer coupled to the torque sensor; and
a torque map generator that measures a current vector value of the motor by switching a MTPA (Maximum Torque Per Ampere) method and a square wave method based on a voltage utilization ratio of the inverter,
wherein the torque map generator utilizes a measurement result by the MTPA method when the torque map generator uses the square wave method,
wherein the MTPA method is selected when the voltage utilization ratio is lower than or equal to a predetermined value, and
wherein the square wave method is selected when the voltage utilization ratio is higher than the predetermined value.

7. A torque map generation method using a motor, an inverter for driving the motor and a controller for controlling the inverter, the torque map generation method comprising:

measuring a voltage utilization ratio of the inverter via the controller; and measuring a current vector of the motor by a MTPA method or a square wave method, wherein the MTPA method and the square wave method is switched from each other based on the voltage utilization ratio, wherein the square wave method utilizes a measurement result by the MTPA method, wherein, in the MTPA method, by adjusting the current vector value using a constant torque curve of the motor, a minimum current vector value for generating a predetermined torque to the motor is measured, and wherein, in the square wave method, starting from the measurement result by the MTPA method, by adjusting the current vector value using a constant rotation square wave voltage circle of the motor, a current vector value for generating a predetermined torque to the motor is measured.

8. The torque map generation method according to claim 7, wherein the minimum current vector value is measured by individually adjusting a current value and an advance angle of the current vector.

9. The torque map generation method according to claim 7, wherein, in the square wave method, when starting from a measured current vector in the measurement result by the MTPA method, an advance angle of the measured current vector is increased.

10. A torque map generation method using a motor, an inverter for driving the motor and a controller for controlling the inverter, the method torque map generation further comprising:

measuring a voltage utilization ratio of the inverter via the controller; and measuring a current vector of the motor by a MTPA method or a square wave method, wherein the MTPA method and the square wave method is switched from each other based on the voltage utilization ratio, wherein the square wave method utilizes a measurement result by the MTPA method wherein the torque map generation method further comprises generating a torque map based on the measurement results by the MTPA method and the square wave method, and wherein the torque map is for converting a torque command value and a speed command value to a d-axis current value and a q-axis current value.

11. The torque map generation method according to claim 10,
wherein the torque map further converts to a voltage command value.

12. A torque map generation method using a motor, an inverter for driving the motor and a controller for controlling the inverter, the torque map generation method comprising:

measuring a voltage utilization ratio of the inverter via the controller; and measuring a current vector of the motor by a MTPA method or a square wave method, wherein the MTPA method and the square wave method is switched from each other based on the voltage utilization ratio, wherein the square wave method utilizes a measurement result by the MTPA method, wherein the MTPA method is selected when the voltage utilization ratio is lower than or equal to a predetermined value, and wherein the square wave method is selected when the voltage utilization ratio is higher than the predetermined value.

* * * * *